July 2, 1935.   J. T. CORLEY   2,006,791
NOZZLE ARRANGEMENT
Filed March 29, 1930   4 Sheets-Sheet 1
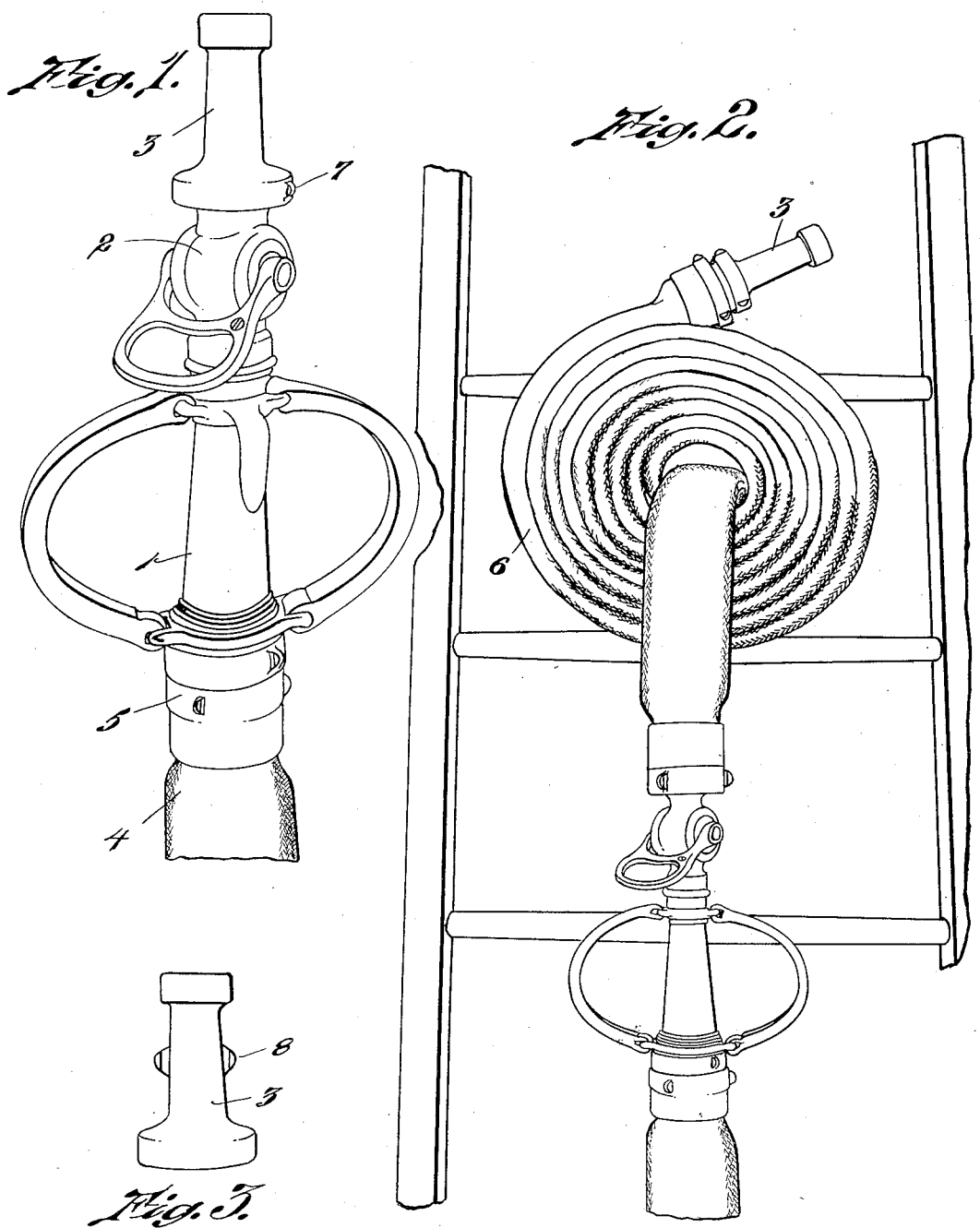
INVENTOR.
John T. Corley
BY Barlow & Barlow
ATTORNEYS.

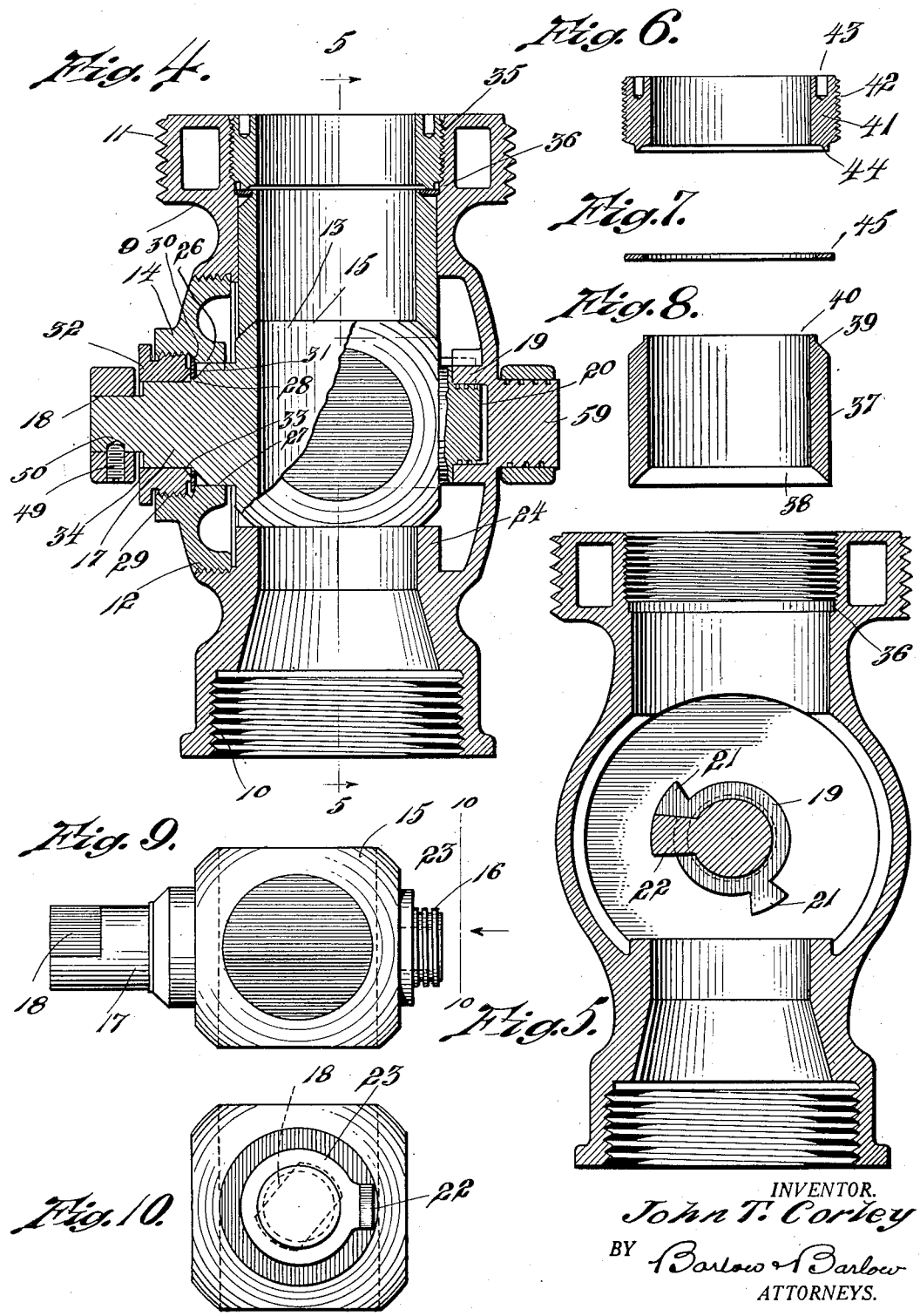

July 2, 1935.  J. T. CORLEY  2,006,791
NOZZLE ARRANGEMENT
Filed March 29, 1930  4 Sheets-Sheet 3
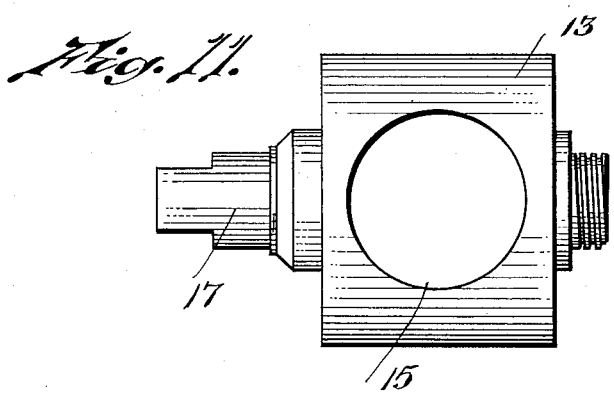
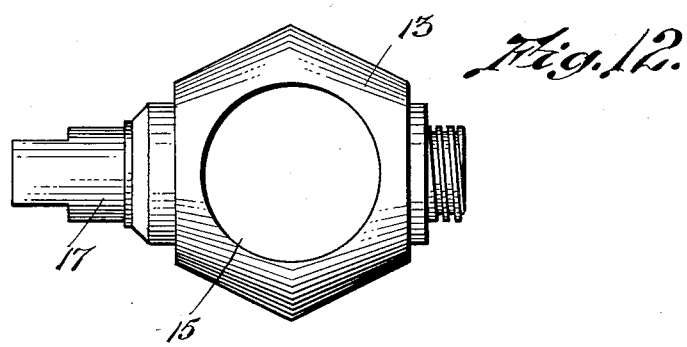
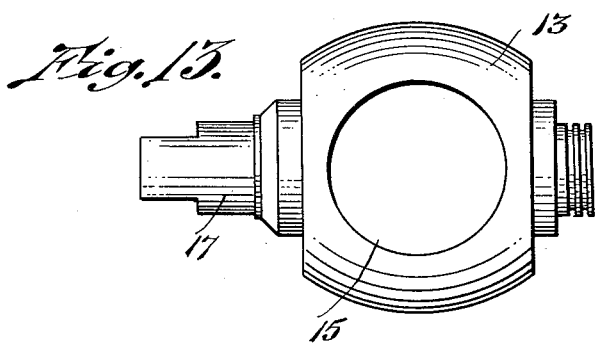
INVENTOR.
John T. Corley
BY Barlow & Barlow
ATTORNEYS.

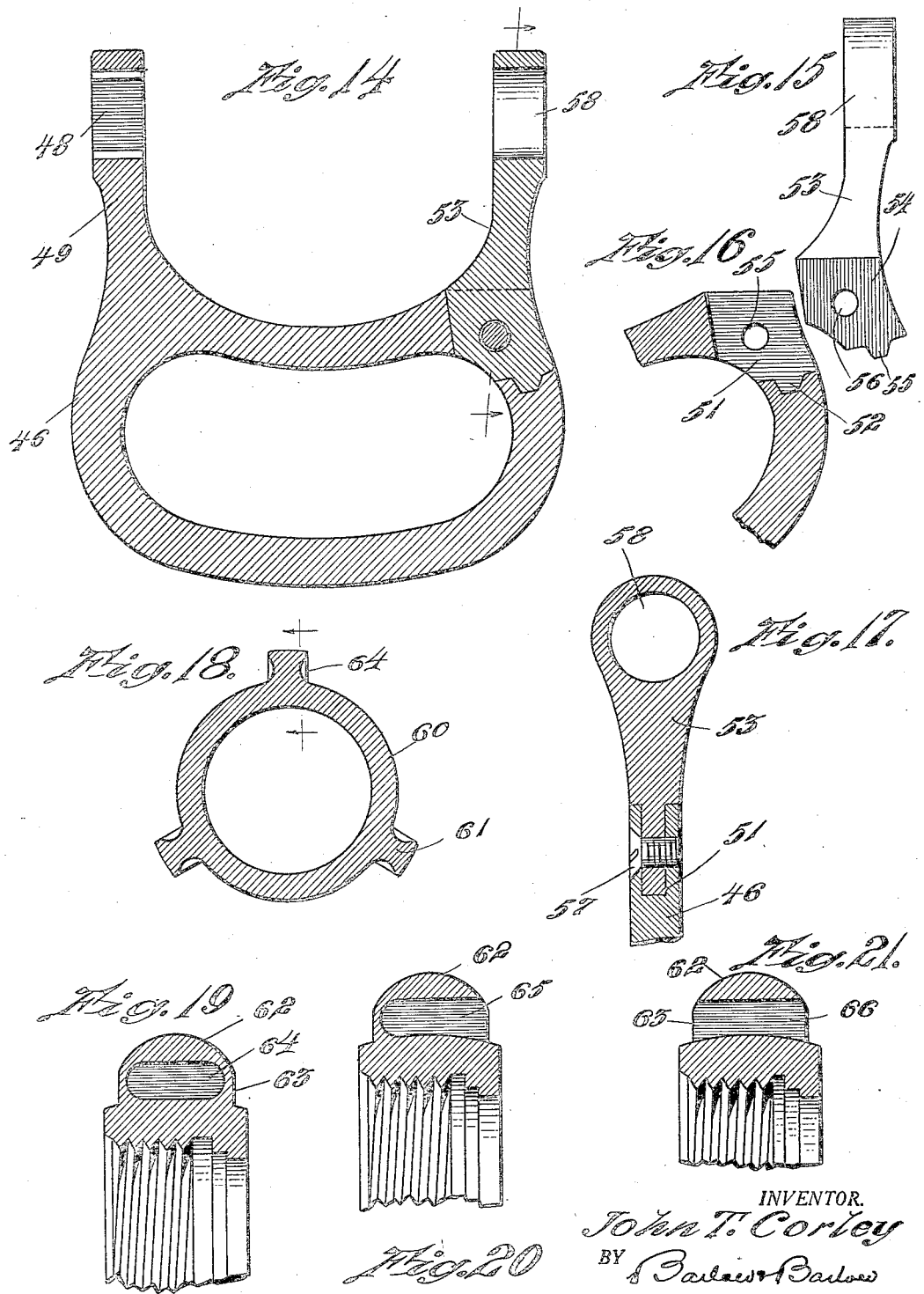

Patented July 2, 1935

2,006,791

UNITED STATES PATENT OFFICE 2,006,791

NOZZLE ARRANGEMENT

John T. Corley, Providence, R. I.

Application March 29, 1930, Serial No. 439,977

8 Claims. (Cl. 251—103)

My present invention relates to fire fighting equipment, and has particular reference to nozzle attachments for hose.

Nozzle attachments for hose have heretofore been designed as units to be attached to a hose by means of a connecting coupling. This construction has rendered it difficult to add hose lengths whenever additional length is necessary, as when a fireman using a nozzle on a ladder finds it advisable to ascend another story or when the length must be extended to reach to another building. The usual procedure in such cases is to shut off the water flow, either by a valve or by hose clamps, remove the nozzle, add a length of hose, and then lock the nozzle to the end of the added hose. Such procedure requires two men, and stops use of the hose for a considerable period of time, since the shut off valves and the hose clamps are usually on the ground at the fire apparatus. One object of my invention is to facilitate the addition of hose lengths and permit the entire change to be under control of one fireman, without danger of injuring the hose by the use of hose clamps.

In addition, the nozzle attachments, when equipped with shut off valves, have required periodic inspection and replacement of rubber gaskets, particularly when the local water used, the addition of chemicals, or the use of chemical solutions, has a deteriorating effect on the rubber gaskets. A further object of my invention is to provide a valve structure which is easily manufactured and assembled, which has no rubber or other gaskets and is not affected by water conditions and the like, and which requires no replacement of parts during the life of the valve.

The hose couplings heretofore used have been provided with spanner lugs adapted to be engaged by a spanner wrench to couple two lengths of hose, or to couple a nozzle attachment to a length of hose. These lugs permit slipping of the spanner wrench, even when provided with grooves, such slipping being most liable to occur during actual fire fighting when speed of coupling is most important. An additional object of my invention is to provide a coupling construction which will minimize slipping.

Further objects and advantageous features will be readily apparent from the detailed description following, in conjunction with the accompanying drawings, and will be particularly set forth in the appended claims.

In the drawings:

Fig. 1 is a perspective view of the novel nozzle attachment;

Fig. 2 is a perspective view showing the addition of a length of hose, on a ladder;

Fig. 3 is an elevation of the nozzle top;

Fig. 4 is a central section through the cut-off valve;

Fig. 5 is a central vertical sectional view through the valve casing on the line 5—5 of Figure 4;

Figs. 6, 7 and 8 are sections of packing parts;

Figs. 9, 10 are respectively front and end views of the valve;

Figs. 11, 12 and 13 are front views of modified forms of valves;

Fig. 14 is a sectional view of the valve cut-off handle;

Figs 15, 16 and 17 are sectional details thereof;

Fig. 18 is a central section of the novel hose coupling; and

Figs. 19, 20 and 21 are enlarged sectional details thereof.

Referring to the drawings, the nozzle attachment includes a nozzle 1, a cut-off valve 2, and a screw tip 3. The nozzle 1 is secured to the hose 4 by a male coupling 5, and has the usual flexible leather handles, secured to the swivel yoke which is mounted on the lower end of the nozzle and the swivel hook ring which is mounted on the upper end of the nozzle.

The nozzle is internally threaded at the lower end, and externally threaded at the upper end with underwriter's standard play-pipe threads, and the valve casing is internally threaded at the lower end to engage the upper end of the nozzle, and externally threaded at the upper end to receive the screw tip 3, which is corespondingly internally threaded at its lower end. The external threads of the valve casing are of standard hose coupling, preferably national standard 2½ inch hose coupling thread, size and pitch, thus permitting direct attachment of an additional hose length 6 to the valve casing, and of the screw tip to the free male end of the hose length, as shown in Figure 2.

The described nozzle arrangement is therefore of the universal type, since an additional hose length may be readily attached whenever required. Such attachment is easily made by the fireman by shutting the cut-off valve, unscrewing the screw tip, and screwing one end of the additional hose length on the valve casing and the screw tip on the other end; the cut-off valve may now be opened to permit stream flow. The screw tip may have lugs 7 at the base thereof, as shown in Figure 1, or lugs 8 may be provided in the center portion, if preferred, as shown in Figure 3.

The described nozzle arrangement therefore facilitates hose control and the addition of hose lengths, is readily manipulated and operated by a single fireman, saves a large proportion of the necessary time for changing, by eliminating any need for returning to the shut-off valves or hydrant valves, and removes all danger of injury to the hose through the use of hose clamps.

If desired, the internal threads on the valve casing may be standard hose coupling threads, the upper end of the nozzle being similarly threaded, so that all parts become interchangeable, and the cut-off valve can be used between two lines of hose as an emergency cut-off.

The cut-off valve

Referring to Figures 4 to 10, the valve casing 9 has internal threads 10 at the lower end, and external threads 11 at the upper end, the casing being axially bored to provide a central fluid passageway. An opening 12 is provided at one side, through which the valve 13 is inserted, the opening being closed by an annular bearing cap 14 as hereinafter described.

The valve 13, as shown in Figure 9, is preferably of the globe type, with a radial port or passageway 15, the sides of the valve being flattened at right angles to the port 15 to facilitate free turning and relieve back pressure by quickly shifting to permit free flow of water around the valve. The use of flat areas and a large port opening reduces the actual bearing surface of the valve, and facilitates easy turning. One end of the valve has square threads 16 which are received in the lathe chuck during turning, and which functions as an end bearing when assembled; the other end of the valve has a valve stem 17 which is milled at the end thereof to provide parallel flat faces 18 for attaching a manually operable handle thereto.

The valve casing has an integral annular flange 19 forming a bearing socket 20 for receiving the valve end 16, the flange being extended as shown in Figure 5 to provide two stops 21 against which a lug 22 on the valve abuts, the lug 22 preferably projecting from a circular collar 23 which is formed on the valve adjacent the end 16. An annular flange 24 is also formed integral with the valve casing and has tapered inlet edges, and functions as an inlet guide for the valve 13. This flange is preferably flat to allow the valve to be assembled on its flat faces by insertion through the opening 12.

In assembling the valve in the valve casing, the valve is turned on one flat face and inserted in the opening 12 until the end 16 is received in the bearing socket 20; the end 16 is packed with grease, and the spaces between the square threads serve to lock the grease in the bearing socket. The insertion of the valve on its flat surface or face permits passage past the flange until the lug 22 is properly positioned between the stops 21 and the end 16 is seated in the socket; the valve is now in position to freely turn, the globe part of the valve rotating within the flange.

The described assembly of the globe valve in the valve casing is facilitated by the positioning of the stops 21, as the valve may be inserted on the flat sides or the port sides, as desired. The flange 24 is therefore preferably formed integral with the valve casing. The annular cap 14 is then screwed in to close the opening, the hub opening 26 of the cap being finished to act as a bearing for a circular collar 27 formed on the valve stem 17. As shown in Figure 4, the circular collar 27 tapers down to a smaller circular collar 28, and the hub opening has an enlarged screw threaded portion 29 which forms a shoulder 30 aligned with the collar 28, the collar 28 and the shoulder 30 receiving and supporting a resilient metal ring 31 therebetween. An annular bushing 52, externally threaded, is now screwed into the hub portion 29, and has an annular projecting ridge 33 which engages the ring 31 between the shoulder 30 and collar 28 to tightly seal the valve stem in the cap 14. The finished bore 34 of the bushing 32 serves as an additional bearing for the contiguous portion of the valve stem 17.

The upper end of the valve casing is internally threaded, as at 35, and is bored to provide a shoulder 36 between the valve casing bore and the threads 35. Positioned in the casing bore is an annular cylinder 37, arcuately shaped at the lower end 38 to contact with and fit the globe valve 13, and tapered at the upper end 39 to form an annular collar 40 which is contiguous to and aligned with the shoulder 36.

One solid face of the valve is preferably machined so as to make a tight seal with the cylinder 37 when the valve is in shut position; the other solid face is undercut or may be cut away, and may if desired be left rough, so that the water space around the valve is always in free communication with the interior of the valve casing and the upper portion of the water space is also in communication with the interior when the valve is open. The water around the valve is therefore free to drain away when the valve casing is uncoupled or the stream is cut off, thus eliminating danger of freezing in cold weather and binding of the valve.

An annular bushing 41 is externally threaded, as at 42, to be screwed into the upper end of the valve casing, turning sockets 43 being provided for this purpose, and has an annular ridge 44 projecting from the lower end to engage the intermediate portion of a resilient metal ring 45 which is mounted between and supported upon the collar 40 and the shoulder 36.

The assembly and operation of the valve may now be explained:

The valve being inserted in the casing, the cap 14 and the ring 31 are positioned in place, and the bushing 32 is then threaded firmly in place to bend the ring 31 and seal the valve stem. The cylinder 37 and the ring 45 are now positioned in place, and the bushing 41 is then threaded firmly into the end of the casing to bend the ring 45 and to seal the valve, the cylinder 37 and the bushing 41.

The valve may now be rotated by turning the valve stem; such rotation, when the valve is subjected to water pressure, is facilitated because the flat areas on the valve permit passage of the water to relieve the pressure on the valve. The water freely flows around the valve, and readily drains from the valve because the undercut lower solid face permits access of air to the upper end of the water chamber when the valve is in open position, but cannot leak, as the two rings 31 and 45 are under tension and effectively stop all leakage. The metal rings do not deteriorate or lose their resilience, are not attacked by local water conditions, and should not require replacement under ordinary conditions of usage for the life time of the valve. The use of a metal sealing ring permits all the valve parts to be constructed of one material when necessary for special chemical control and the like. To resurface the valve, the valve is removed through the opening 12, and the bearing end 16 is threaded into a lathe chuck or similar holder.

The valve may, if desired, be cylindrical, double conical, or barrel shaped in form, as shown in Figures 11, 12 and 13; the described leakage prevention construction functions perfectly for all forms. Since the valve is positively stopped in "on" and "off" position, any bending or twisting of the operating handle cannot affect the valve port alignment.

The operating handle

As previously described, the end of the valve stem is milled to form two parallel flat faces 18; the handle 46, shown in Figure 4, is P shape in form and has one arm 47 with a corresponding opening 48 therethrough, or if preferred, a rectangular slot, the end of the valve stem passing into the opening 48 and being secured therein by a set screw 49 which seats in a recess 50 in one face of the valve stem.

The handle 46 has a slot or cut 51 formed at the other end thereof, generally square in shape, with a locking recess 52; an arm 53 has a tongue 54 shaped to fit into the slot, with a projection or tooth 55 to fit into the locking recess 52, the tongue 54 and the handle 46 having aligned threaded openings 55, 56 through which a set screw or the like 57 is threaded to lock the arm 53 to the handle. The arm 53 has a circular opening 58 adapted to rotatably fit over a circular hub 59 which is integral with the valve casing and is in axial alignment with the valve stem. The hub 59, like the end 16, has square threads to facilitate chucking during manufacture and repairs.

To assemble the operating handle, the handle 46 is positioned so that the opening 48 passes over the faces 18, and the set screw 49 is screwed in to lock the handle on the valve stem; the arm 53 is then positioned over the bearing hub 59 and locked in engagement with the handle by the set screw 57, the handle being slightly sprung to lock the tooth 55 in the recess 52.

The operating handle construction is simple to manufacture and to assemble, has no projecting bolts or screws, thus facilitating the grip of the user, and is designed to withstand the roughest usage.

The coupling ring

The coupling ring for connecting the hose lengths to the nozzle, and for connecting hose lengths together, has also been improved to facilitate coupling and to prevent slipping of the usual spanner wrenches, thus facilitating control by the fireman and saving time during fire fighting operations. As shown in Figures 18 and 19, the coupling ring 60 has a plurality of lugs 61 which have rounded upper portions 62 and flat side portions 63, the faces of the lugs being provided with transverse grooves 64 which do not extend completely across the face of the lug, but instead form recesses or sockets which lockingly receive spanner wrenches of the bent-in end type. The flat side portions 63 permit circular turning of the coupling, and facing of the ends of the lugs to provide identical widths. The spanner wrench ends fit into the transverse sockets, and cannot slip sideways during turning. The groove 64 may be a through slot, if desired. To facilitate insertion of the spanner wrench end, the recess or socket may be open at one end if desired, as shown at 65 in Figure 20, the closed end being effective to prevent slipping. The groove also may be open at both ends, as shown at 66 in Figure 21, when used with spanner wrenches equipped with eyes for engaging the coupling lugs, as the end of the eye then catches under the groove.

The rounded tops of the connecting lugs prevent catching of the lugs in the folds of the hose lengths, and glide smoothly over obstructions such as ladder rungs, curbings, car rails, and the like.

While I have described a specific nozzle attachment, desired changes in construction and in arrangement to suit the requirements of different communities and different operating conditions may obviously be made, without departing from the spirit and the scope of the invention as defined in the appended claims.

I claim:

1. In a cut-off valve for hose nozzles, a valve casing having a bore therethrough, a valve member mounted transversely of said bore, a radial port opening through said valve member, a movable tubular cylinder engaging said valve member and having an annular collar at its upper end spaced from said bore, said bore having a shoulder adjacent said collar, a metallic ring mounted on said shoulder and engaging said collar, and means for forcing said ring tightly against said shoulder and said collar.

2. In a cut-off valve for hose nozzles, a valve casing having a bore therethrough, a valve member mounted transversely of said bore, a radial port opening through said valve member, a movable tubular cylinder engaging said valve member, said cylinder having a tapered top terminating in an anular collar spaced from said bore, a shoulder on said bore adjacent said collar, a ring mounted on said shoulder and said collar, and a tubular bushing screw threadedly mounted in said bore and engaging said ring to force said ring tightly against said shoulder and said collar.

3. In a cut-off valve for hose nozzles, a valve casing having a bore therethrough, a valve member mounted transversely of said bore, a radial port opening through said valve member, a movable tubular cylinder engaging said valve member, said cylinder having a tapered top terminating in an annular collar spaced from said bore, a shoulder on said bore adjacent said collar, a ring mounted on said shoulder and said collar, and a tubular bushing screw threadedly mounted in said bore and having an annular ridge engaging said ring to force said ring tightly against said shoulder and said collar.

4. In a cut-off valve, a valve casing having a bore therethrough and an opening in the side thereof, a bearing socket in alignment with said opening, a valve member rotatably mounted in said bearing socket and positioned transversely of said bore, a valve stem projecting through said opening having a portion terminating in an annular collar, an annular closure cap in said opening rotatably supporting the valve stem, an internal shoulder on said closure cap adjacent said collar, a metallic ring seated on said collar and said shoulder, and an annular bushing mounted in said cap and having an annular ridge engaging said ring to force said ring tightly against said valve stem collar and shoulder.

5. In a valve construction, a valve casing having a bore, a globe valve member mounted transversely in said bore and having a radial flow passageway therethrough, a water chamber around said valve member, inlet and outlet flow guide cylinders in said bore for controlling the flow stream, said valve member having cut-away portions in axial alignment with said passageway for reducing bearing surface and for communicating the water chamber with the casing bore and the flow passageway to quickly relieve pressure by allowing free flow around and through said valve member upon initial movement of the valve member, and to permit drainage of the water chamber.

6. In a sealing arrangement for valves and the like, a member having a bore for the passage of a fluid, concentric spaced annular ring engaging portions about said bore, an annular ring having one surface contacting said portions, and a second member having an annular ring engaging portion engaging the other surface of said ring intermediate said first portions, whereby said ring is in fluid tight engagement with both said members.

7. In a sealing arrangement for valves and the like, a valve casing having a bore for the passage of a fluid and an annular bearing area, a rotatable valve in said bore, a movable member mounted in said bore and engaging said valve and having an annular bearing area concentric with and spaced from said valve casing bearing area, an annular ring having one face thereof contacting the spaced bearing areas of said casing and said movable member, and a member mounted in said casing and engaging the other face of said ring intermediate said concentric spaced bearing areas to seal said movable member with respect to said valve casing.

8. In a sealing arrangement for valves and the like, a valve casing having a bore for the passage of a fluid and an annular bearing area, a rotatable valve in said bore, a movable tubular sealing member in said bore and contacting said valve and having an annular bearing area concentric with and spaced from said valve casing bearing area, a ring sealing member having one face thereof engaging the spaced bearing areas of said casing and said tubular member, and a tubular bushing mounted in said casing and engaging the other face of said ring sealing member intermediate said spaced concentric bearing areas.

JOHN T. CORLEY.